June 22, 1954
R. J. MILLER
2,681,709
LIVE POWER TAKE-OFF FOR TRACTORS
Filed Feb. 27, 1952
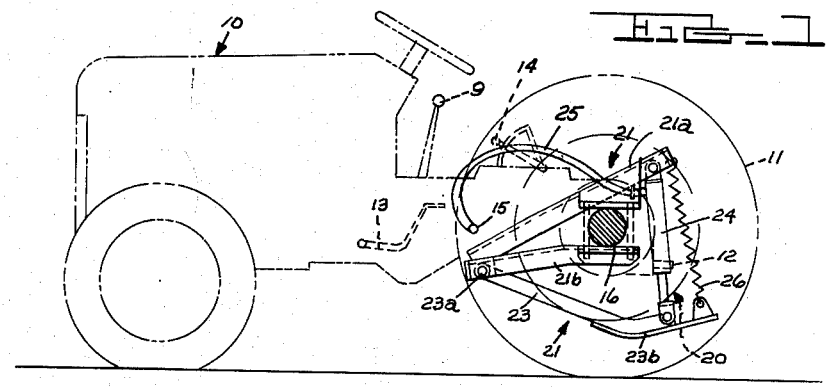
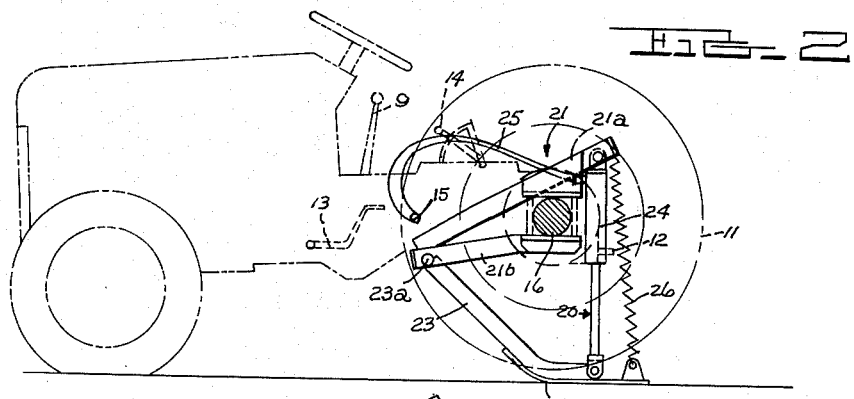
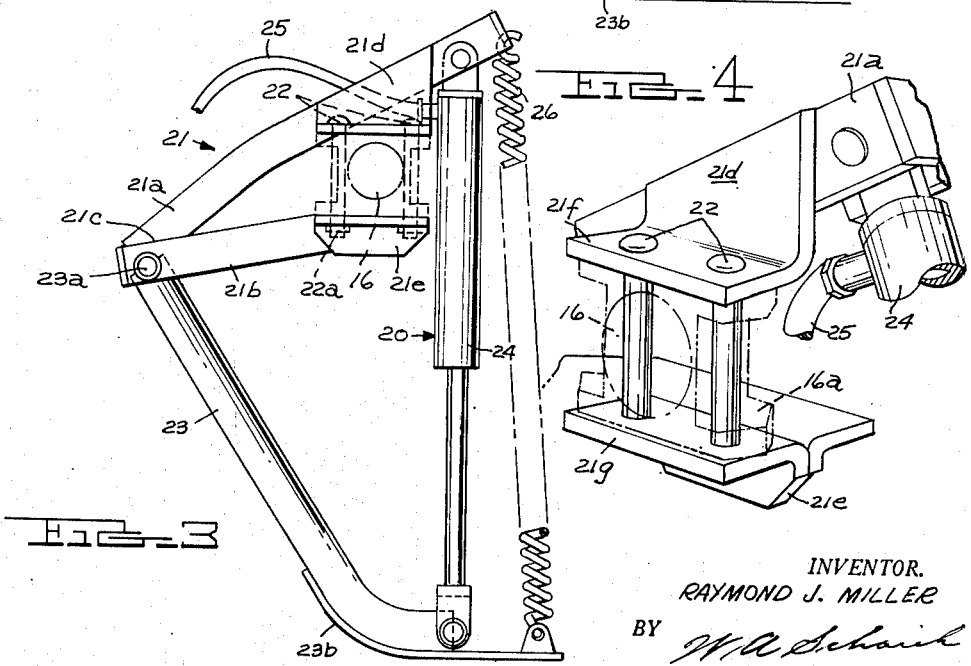
INVENTOR.
RAYMOND J. MILLER
BY
ATTORNEYS Patented June 22, 1954

2,681,709

UNITED STATES PATENT OFFICE 2,681,709

LIVE POWER TAKE-OFF FOR TRACTORS

Raymond J. Miller, Detroit, Mich., assignor, by mesne assignments, to Ford Motor Company, Dearborn, Mich., a corporation of Delaware Application February 27, 1952, Serial No. 273,670

1 Claim. (Cl. 180—53)

This invention relates to an improved control device for tractors having power-take-off shafts for operation of connected implements, and more particularly to an improved mechanism for selectively interrupting the forward travel of the tractor without interrupting power transmission by the power-take-off shaft.

Up to the present time, almost all agricultural tractors have been equipped with a power-take-off shaft which is utilized for operation of connected implements, and particularly harvesting type implements such as corn pickers, combines, forage harvesters, hay balers, etc. In most of the well-known tractors, the application of power to both the tractor rear wheels and the power-take-off shaft has been controlled through a single clutch so that interruption of the forward motion of the tractor by operation of such clutch necessarily means an interruption of the power to the power-take-off shaft. In many harvesting operations, it is desirable to interrupt the forward travel of the tractor yet to continue the operation of the harvesting implement so as to clear any excess accumulation of the crop being harvested. With the single clutch, this required the operator to shift the tractor gears to neutral. Accordingly, tractors have been designed with double clutch arrangements respectively controlling the application of power to the tractor rear wheels and the power-take-off shaft to accomplish this objective. Necessarily, the incorporation of such additional clutch requires substantial modification of the power transmission mechanism of the tractor and it is virtually impossible for the farmer to economically accomplish this on his present tractor that has only the single clutch.

Accordingly, it is an object of this invention to provide an improved control device for single clutch tractors having power-take-off shafts driven concurrently with the rear wheels, whereby the forward motion of the tractor may be selectively interrupted without interruption of power transmission by the power-take-off shaft.

A particular object of this invention is to provide an hydraulically controlled jacking device adjacent one of the differentially geared rear wheels of a tractor which may be selectively actuated while the tractor is in motion to engage the ground and elevate the adjacent rear wheel and thus interrupt the forward motion of the tractor without effecting the transmission of power to the tractor power-take-off shaft.

The specific nature of this invention, as well as other objects and advantages thereof, will become apparent to those skilled in the art from the following detailed description taken in conjunction with the attached drawing on which, by way of preferred example only, is illustrated one embodiment of this invention.

On the drawings:

Figure 1 is a side elevational view of a tractor, with one rear wheel removed, showing a jack constructed in accordance with this invention mounted on the tractor rear axle and shown in its elevated position;

Figure 2 is a view similar to Figure 1 but showing the jack in its down position for elevating one of the tractor rear wheels;

Figure 3 is an enlarged scale detail side elevational view of the jack; and

Figure 4 is an enlarged scale detail perspective view showing the mounting bracket for attaching the jack to the tractor rear axle.

As shown on the drawings:

The numeral 10 refers to a well-known type of agricultural tractor having a pair of differentially geared rear wheels 11 and a power-take-off shaft 12 extending rearwardly from the central rear portion of the tractor. Such power-take-off shaft may be connected in conventional manner to any one of a plurality of well-known type of farm implements for transmission of power to such implements. The tractor 10 includes a transmission gear shift lever 9 and a single clutch 13 which controls the application of power by the engine concurrently to the rear wheels 11 and the power-take-off shaft 12. Depression of clutch 13 will in conventional fashion disconnect the engine from both the rear wheels and the power-take-off shaft. Additionally, the tractor is provided with a conventional built-in hydraulic mechanism (not shown) controllable by a manually operated lever 14 and operable to supply pressured fluid through an outlet 15.

In accordance with this invention, a control device for effecting the selective interruption of forward motion of the tractor without interrupting the transmission of power to the power-take-off shaft comprises a hydraulically actuated jacking device 20 which is mounted on the tractor rear axle 16 at a position adjacent one of the differentially geared rear wheels 11. Such jacking device may conveniently comprise a frame structure 21 including angularly disposed frame bars 21a and 21b rigidly connected at the forward ends as at 21c and at their rear ends having mounting brackets 21d and 21e respectively rigidly secured thereto, mounting brackets 21d and 21e having laterally projecting, vertically spaced flanges 21f and 21g which are so constructed as to surmount the fender mounting boss 16a conventionally provided on the rear axle housing 16 of tractor 10. A pair of bolts 22 are inserted through suitable holes in the fender mounting boss 16a and the flanges 21f and 21g and are secured by nuts 22a. A jack lever 23 is provided which is pivotally mounted in depending relationship as at 23a to the forward end of the jack frame 21. At its lower end, the jack lever 23 has a ground engaging skid shoe 23b rigidly secured thereto. An actuating hydraulic cylinder 24 is then pivotally mounted intermediate the rear end of jack frame element 21a and the bottom end of jack lever 23. A conduit 25 supplies actuating fluid to cylinder 24 by connection to the discharge outlet 15 of the tractor hydraulic system. If the tractor hydraulic system is of the conventional single acting type, it is necessary to additionally provide a spring 26 connected between the frame element 21a and the skid shoe 23b in parallel relationship to the actuating cylinder to effect the return movement of the jacking lever 23 when pressure is removed from the actuating cylinder.

In normal operation of the tractor and a connected power-take-off driven implement (not shown) the jacking lever 23 and the ground engaging skid shoe 23b are held by the spring 26 in the elevated position shown in Figure 1 and hence the jacking device is entirely inoperative and the forward motion of the tractor and the application of power to the power-take-off shaft 12 are concurrently controlled by the single clutch 13. Whenever it is desired to interrupt the forward motion of the tractor, the hydraulic mechanism of the tractor is actuated by manual operation of the control lever 15 and pressured hydraulic fluid is then supplied to the actuating cylinder 24. This forces the jacking lever 23 downwardly and engages the skid shoe 23b with the ground and hence elevates the adjacent tractor rear wheel 11. Since the tractor rear wheels 11 are differentially geared in conventional manner, the elevated rear wheel will spin but no driving torque will be applied to the other rear wheel which is still in contact with the ground. Accordingly, the application of power from the tractor engine to produce forward motion of the tractor will be effectively interrupted yet there will be no interruption of transmission of power of the tractor engine to the tractor power-take-off shaft 12. Obviously it is not necessary for the operator to shift gears, and forward travel may be resumed by de-energizing cylinder 24.

From the foregoing description, it is apparent that this invention provides an unusually simple and economical control device for single clutch tractors having power-take-off shafts by which the application of power of the tractor engine to the power-take-off shaft may be selectively accomplished independently of the forward motion of the tractor and without requiring the operator to actuate the tractor clutch or shift gears.

It will, of course, be understood that many details of construction may be varied through a wide range without departing from the principles of this invention and it is, therefore, not the purpose to limit the patent granted hereon otherwise than necessitated by the scope of the appended claim.

I claim:

In a tractor having an engine connected to a pair of driving wheels through a set of differential gears enclosed within a rear axle housing and connected to a rotatable power-take-off shaft for powering an implement, and an hydraulic system driven by said engine, a live power-take-off attachment for said tractor, comprising an elongated arm pivotally connected at one end to said tractor and to one side of the tractor longitudinal center line and extending rearwardly of said tractor and beneath said rear axle housing, said arm being adapted to pivot from a ground-engaging, lowered position to a raised position adjacent said axle housing, an hydraulic cylinder and piston assembly having its one end pivotally connected to said tractor and having its other end pivotally connected to the other end of said elongated arm, and a skid shoe on said other end of said arm, said skid shoe being adapted to contact the ground in lateral alignment with said wheels when said arm is in a lowered position, and means connecting said hydraulic cylinder to said hydraulic system, whereby actuation of said hydraulic cylinder causes said arm to move downwardly and engage said skid shoe with the ground to elevate one of said driving wheels for halting tractor travel without interrupting rotation of said one wheel and said power-take-off shaft.

References Cited in the file of this patent

UNITED STATES PATENTS

| Number | Name | Date |
| --- | --- | --- |
| 1,161,706 | Lohmiller et al. | Nov. 23, 1915 |
| 1,266,527 | De Marco | Feb. 19, 1918 |
| 1,486,133 | Elliot et al. | Mar. 11, 1924 |
| 1,703,669 | Hansen-Ellehammer | Feb. 26, 1929 |
| 1,867,257 | Esseling | July 12, 1932 |